United States Patent [19]

Ishiwata

[11] Patent Number: 4,957,140
[45] Date of Patent: Sep. 18, 1990

[54] HYDRAULIC PRESSURE CONTROL VALVE FOR USE WITH BRAKE MASTER CYLINDER

[75] Inventor: Ichiro Ishiwata, Yokosuka, Japan

[73] Assignee: Nippon Air Brake Co., Ltd., Japan

[21] Appl. No.: 337,955

[22] Filed: Apr. 14, 1989

[51] Int. Cl.$^5$ .............................................. G05D 16/04
[52] U.S. Cl. ................................. 137/505.25; 303/9.62
[58] Field of Search ................. 137/505.25; 303/9.62, 303/9.75

[56] References Cited

U.S. PATENT DOCUMENTS

| 3,945,686 | 3/1976 | Orzel | 137/505.25 X |
| 3,964,795 | 6/1976 | Mathues | 303/9.62 |
| 4,669,268 | 6/1987 | Takeuchi et al. | 303/9.75 X |
| 4,785,847 | 11/1988 | Steer et al. | 137/505.25 |

FOREIGN PATENT DOCUMENTS 3301903  6/1984  Fed. Rep. of Germany ..... 303/9.62

Primary Examiner—Stephen M. Hepperle
Attorney, Agent, or Firm—Kane, Dalsimer, Sullivan, Kurucz, Levy, Eisele and Richard

[57] ABSTRACT

In a hydraulic pressure control valve for use with a brake master cylinder, a hollow body of one-piece structure has an internal stepped bore through which outlet and inlet bores formed respectively in one and other ends of the body communicate with each other. A mounting portion to the master cylinder is provided adjacent the other end of the body. A piston is arranged in the stepped bore for reciprocative movement therealong in response to hydraulic pressure from the master cylinder. One end of the piston remote from the outlet bore has an end face serving as a valve seat. A substantially tubular cap element is arranged in the inlet bore and supports the one end of the piston. The cap element is fixed to the body by fixing arrangement which is accompanied with no relative rotation between the cap element and the body. A valve element arranged in a valve chamber defined by the cap element is normally spaced away from the valve seat, but is seated thereon when the hydraulic pressure reaches a predetermined level to move the piston toward the valve element.

10 Claims, 2 Drawing Sheets

HYDRAULIC PRESSURE CONTROL VALVE FOR USE WITH BRAKE MASTER CYLINDER

BACKGROUND OF THE INVENTION

The present invention relates to a hydraulic pressure control valve for use with a brake master cylinder.

A hydraulic pressure control valve of the kind referred to above is known from, for example, European Patent Application No. 0 157 158 A2 (corres. to Japanese Patent Application Laid-Open No. Sho 60-226347), GB Patent Application No. 2 195 408A or the like. The known control valve comprises a housing, and components parts arranged wtihin the housing such as a piston, a preload spring, a valve element and so on. The housing is divided into a pair of first and second members which are threadedly engaged with each other. The first member or a body member is formed with a connector portion for piping leading to a brake actuator such as a wheel cylinder for rear wheels. On the other hand, the second member or a closure member is formed with a mounting portion such as, for example, threads by which the hydraulic pressure control valve is mounted to a brake master cylinder.

However, the above-described conventional hydraulic pressure control valve has the following problem, because the housing is divided into the first and second members which are threadedly engaged with each other. That is, when the first and second members are connected together, the connection is accompanied with relative rotation between them. The relative rotation causes torsion to be applied to the preload spring which is one of the component parts within the housing. Alternatively or in addition, the relative rotation causes wear to occur on the piston, or causes the surface of the piston to be rubbed. These result in defects such as leakage of hydraulic fluid, defective movement or operation of some component parts, and the like.

Further, the conventional hydraulic pressure control valve has also the following problem. That is, when the component parts are assembled together to form the control valve, some of the component parts such as the piston and the like are incorporated in a space defined between the first and second members and, subsequently, the remaining component parts such as the valve element and the like are required to be inserted in the housing through an end of the second member remote from the first member. In other words, the component parts must be mounted to the second member through the opposite ends thereof. Thus, the assembling of the control valve is troublesome and cumbersome, and it takes a considerable time for the assembling, resulting in an increase in the assembling cost, which, in turn, results in an increase in the manufacturing cost of the control valve.

SUMMARY OF THE INVENTION

It is therefore an object of the invention to provide a hydraulic pressure control valve capable of eliminating the defects of the prior art, such as leakage of hydraulic fluid, defective movement or operation of internal component parts, and so on, which may occur when various component parts are assembled together to form the control valve.

For the purpose, according to the invention, there is provided a hydraulic pressure control valve for use with a brake master cylinder, comprising:

a hollow body of one-piece structure having an outlet bore and an inlet bore formed respectively in one and other ends of the body, the body having an internal stepped bore which extends between the outlet bore and the inlet bore and through which the outlet bore and the inlet bore communicate with each other, the body being provided, adjacent the other end thereof, with a mounting portion to the master cylinder;

a piston arranged in the stepped bore of the body for reciprocative movement along the stepped bore in response to hydraulic pressure introduced into the body from the master cylinder, the piston being formed therein with a passage through which the outlet bore and the inlet bore communicate with each other, the piston having one end thereof remote from the outlet bore, whose end face serves as a valve seat;

spring means arranged within the body for biasing the piston toward the outlet bore;

a substantially tubular cap element arranged in the inlet bore for substantially closing the stepped bore, wherein the cap element supports the one end of the piston, and wherein the cap element has an inner peripheral surface thereof which defines a valve chamber;

fixing means arranged between the cap element and the body for fixing the cap element to the body without being accompanied with rotation of the cap element and the body relative to each other; and a valve element arranged wtihin the valve chamber in facing relation to the valve seat provided at the one end of the piston, wherein the valve element is normally spaced away from the valve seat, but is seated on the valve seat when the hydraulic pressure reaches a predetermined level to move the piston toward the valve element against biasing force of the spring means, thereby causing the valve element to close the passage in the piston.

As described above, the arrangement of the hydraulic pressure control valve according to the invention is such that the mounting portion to the master cylinder is provided on the body, the cap element is arranged in the inlet bore of the body, and the fixing means is arranged between the cap element and the body to fix the cap element to the body without being accompanied with relative rotation between them. With such arrangement, when various internal component parts are assembled together, no torsion is applied to the component parts, and the component parts can be prevented from being rubbed against each other. Thus, the component parts can properly be set within the body, making it possible to effectively eliminate defects such as leakage of hydraulic fluid, defective movement or operation of the component parts, and so on.

BRIEF DESCRIPTION OF THE INVENTION

FIG. 1 is a longitudinal cross-sectional view of a hydraulic pressure control valve according to an embodiment of the invention; and FIG. 2 is a view similar to FIG. 1, but showing another embodiment of the invention.

DETAILED DESCRIPTION

Figure 1:
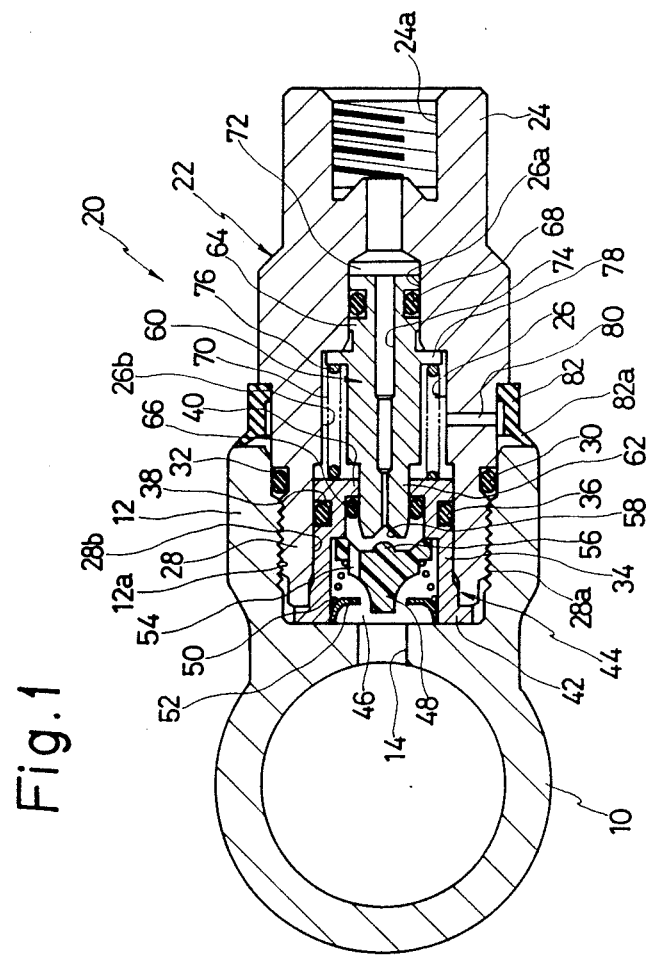

Referring first to FIG. 1, there is shown a hydraulic pressure control valve, generally designated by the reference numeral 20, according to an embodiment of the invention. The control valve 20 is adapted to be mounted to a tandem master cylinder for a brake as disclosed in, for example, the aforementioned European Patent Application No. 0 157 158 A2. The master cylinder comprises a cylinder body 10 provided at its side with a discharge section leading to a brake circuit for rear wheels. The discharge section is composed of a boss 12 and a discharge port 14 formed at the center of the boss 12. The hydraulic pressure control valve 20 adapted to be mounted to the discharge section of the cylinder body 10 has such a function is to reduce brake pressure for rear wheels by a predetermined ratio as compared with that for front wheels.

The hydraulic pressure control valve 20 comprises a hollow body 22 of one-piece structure having one end thereof which serves as a connector section 24 for connectin to piping of the brake circuit for the rear wheels. Specifically, the connector section 24 is provided with a threaded outlet bore 24a to which connected is one end of a pipe leading to a wheel cylinder of the rear brake circuit. The body 22 has the other end 28 formed therein with an inlet bore 28b. Further, the body 22 has an internal stepped bore 26 which extends axially between the outlet bore 24a and the inlet bore 28b and through which the outlet bore 24a and the inlet bore 28b communicate wtih each other. The stepped bore 26 is composed of a small-diameter bore section 26a and an intermediate-diameter bore section 26b. The small-diameter bore section 26a is located adjacent the outlet bore 24a. The inlet bore 28b is larger in diameter than the intermediate-diameter bore section 26b which, in turn, is larger in diameter than the small-diameter bore section 26a.

The body 22 is provided, adjacent the other end 28 thereof, with a mounting portion to the cylinder body 10 of the master cylinder. In the illustrated embodiment, the mounting portion of the body 22 is constituted by male threads 28a which are formed on an outer peripheral surface of the body 22 adjacent the other end 28 thereof. The male threads 28a are threadedly engageable with female threads 12a which are formed on the inner peripheral surface of the boss 12 on the cylinder body 10 of the master cylinder. An annular groove 32 for an O-ring seal element 30 is formed in the outer peripheral surface of the other end 28. By the threaded engagement between both the threads 28a and 12a, the body 22 of the hydraulic pressure control valve 20 is mounted to the side of the cylinder body 10 of the master cylinder.

A piston 60 having a stepped configuration is arranged in the stepped bore 26 of the body 22 for reciprocative movement along the stepped bore 26 in response to hydraulic pressure introduced into the body 22 from the cylinder body 10 of the master cylinder. The stepped piston 60 is composed of a small-diameter section 62 and a large-diameter section 64. The large-diameter section 64 is fitted in the small-diameter bore section 26a of the stepped bore 26 in the body 22. An O-ring seal element 68 is arranged between the large-diameter section 64 of the piston 60 and the small-diameter bore section 26a of the stepped bore 26. On the other hand, the small-diameter section 62 is located within the inlet bore 28b of the body 22. The piston 60 is formed therein with a stepped passage 74 through which the outlet bore 24a and the inlet bore 28b communicate with each other. The small-diameter section 62 of the piston 60 has an end face which serves as a valve seat 58. The stepped passage 74 has one end thereof which opens to the valve seat 58.

A substantially tubular cap element 34 is arranged within the inlet bore 28b of the body 22 for substantially closing the stepped bore 26. The cap element 34 has a peripheral wall whose outer diameter is matched to the diameter of the inlet bore 28b. An annular groove 38 for an O-ring seal element 36 is formed in the outer surface of the peripheral wall of the cap element 34. The cap element 34 is provided, at its one end, with a radially inwardly extending flange 40 and, at the other end, with a radially outwardly extending flange 42. The inward flange 40 has an inner peripheral surface which supports the small-diameter section 62 of the piston 60. The peripheral wall of the cap element 34 has an inner surface which defines a valve chamber 46. An O-ring seal element 66 is arranged between the small-diameter section 62 of the piston 60 and the inner surface of the peripheral wall of the cap element 34.

The piston 60 has a flange 78 which is located between the one and other ends of the piston 60. Specifically, the flange 78 extends radially outwardly from an outer peripheral surface of the large-diameter section 64 of the piston 60. A preload spring 76 is arranged within the body 22 for biasing the piston 60 toward the outlet bore 24a. That is, the preload spring 76 is interposed between the flange 78 and the inward flange 40 of the cap element 34. The piston 60 is normally held stationary under the biasing force of the preload spring 76 such that the flange 78 is abutted against a step between the small-diameter and intermediate-diameter bore sections 26a and 26b of the stepped bore 26 in the body 22.

Fixing means is arranged between the cap element 34 and the body 22 for fixing the cap element 34 to the body 22 without being accompanied with rotation of the cap element 34 and the body 22 relative to each other. In the illustrated embodiment, the fixing means is formed by force-fitting 44 of the cap element 34 into the inlet bore 28b of the body 22. Specifically, the peripheral wall of the cap element 34 has an end portion adjacent the open end of the cap element 34, which is larger in thickness than the remaining portion of the peripheral wall of the cap element 34. The body 22 has a peripheral wall section surrounding the inlet bore 28b, whose end portion adjacent the other end 28 of the body 22 is smaller in thickness than the remaining portion of the peripheral wall section of the body 22. When the cap element 34 is force-fitted into the inlet bore 28b of the body 22, the relatively thin remaining portion of the peripheral wall of the cap element 34 is first inserted into the inlet bore 28b such that the small-diameter section 62 of the piston 60 is fitted in and supported by the inner peripheral surface of the inward flange 40 on the cap element 34. At the final stage of the insertion of the cap element 34 into the inlet bore 28b, the end portion of the peripheral wall of the cap element 34 is force-fitted at 44 into the end portion of the peripheral wall section of the body 22. By doing so, it is possible to prevent the force-fitting from inadvertently deforming the remaining portion of the peripheral wall section of the body 22 and the remaining portion of the peripheral wall of the cap element 34.

The outward flange 42 of the cap element 34 has an end face adjacent the inlet bore 24a, which serves as a stopper at the time the cap element 34 is force-fitted into the inlet bore 28b of the body 22. On the other hand, an end face of the outward flange 42 remote from the inlet bore 28b serves as a stopper at the time the hydraulic pressure control valve 20 is mounted to the boss 12 of the cylinder body 10 of the master cylinder.

A poppet valve element 48 having a generally truncated conical configuration is arranged within the valve chamber 46 in facing relation to the valve seat 58 provided at the end of the piston 60. Specifically, the valve element 48 has a large-diameter end which is formed at its center with a semi-spherical projection 56. The semi-spherical projection 56 is so arranged as to face toward the valve seat 58. The semi-spherical projection 56 is capable of being seated on the valve seat 58 in response to movement of the piston 60, subsequently to be described. A communication bore 54 is formed in the valve element 48 at a location adjacent the semi-spherical projection 56.

A coil valve spring 50 is arranged within the valve chamber 46 for biasing the valve element 48 toward the valve seat 58 provided at the end of the piston 60. The large-diameter end of the valve element 48 is urged against a step formed on the inner peripheral surface of the cap element 34 under biasing force of the valve spring 50. The valve element 48 is normally spaced away from the valve seat 58, but is seated on the valve seat 58 when the hydraulic pressure introduced into the control valve 20 from the master cylinder reaches a predetermined level to move the piston 60 toward the valve element 48 against the biasing force of the preload spring 76, thereby causing the valve element 48 to close the stepped passage 74 in the piston 60.

The valve spring 50 has one end thereof which is supported by the valve element 48. The other end of the valve spring 50 is supported by a dish-like spring retainer 52 which is fixedly mounted in the valve chamber 46. That is, the spring retainer 52 is force-fitted into the valve chamber 46 such that the spring retainer 52 is fixedly mounted to the cap element 34 to effectively prevent the valve element 50 from getting out of the valve chamber 46. In the manner described above, the valve spring 50 is interposed between the spring retainer 52 and the valve element 48 for biasing the latter into abutment against the step of the inner peripheral surface of the cap element 34.

As described previously, the piston 60 is arranged in the stepped bore 26 for reciprocative movement therealong. The O-ring seal elements 66 and 68 arranged about the piston 60 prescribes or regulates a pressure reducing ratio of the hydraulic pressure control valve 20. The piston 60 divides a space of the stepped bore 26 into two chambers including an atmospheric chamber 70 and an outlet chamber 72. The outlet chamber 72 has one end thereof which communicates with the outlet bore 24a at the connecting section 24. The other end of the outlet chamber 72 communicates with the valve chamber 46 through the stepped bore 74 in the piston 60. Normally, the piston 60 is subject to the biasing force of the preload spring 76 so that the flange 78 is abutted against the step between the small-diameter and large-diameter bore sections 26a and 26b. Thus, the piston 60 is held stationary. However, the hydraulic pressure discharged from the cylinder body 10 of the master cylinder reaches a predetermined level, a difference between pressures acting respectively upon the opposite ends of the piston 60 overcomes the biasing force of the preload spring 76, thereby moving the piston 60 toward the valve element 48 so that the semi-spherical projection 56 is seated on the valve seat 58.

The atmospheric chamber 70 communicates with the atmosphere through a radial aperture 80 formed through the peripheral wall of the body 22. An annular seal element 82 provided with an annular lip 82a is arranged about the body 22 so as to cover the aperture 80.

When the above-described various component parts are assembled together to form the hydraulic pressure control valve 20, the entire internal component parts such as the piston 60, the preload spring 76 and so on are incorporated in the body 22 only through the other end 28 of the body 22. Thus, the assembling is made easy and simple so that a time required for the assembling can be shortened, making it possible to reduce the assembling cost. Further, the cap element 34 is force-fitted at 44 into the inlet bore 28b of the body 22, to set the internal component parts such as the piston 60, the preload spring 76 and so on within the body 22. In other words, when the internal component parts are set within the body 22, the setting is accompanied with any no relative rotation between the cap element 34 and the body 22. Accordingly, it is possible to effectively prevent torsion from being applied to the preload spring 76. It is also possible to effectively prevent wear from occurring on the piston 60, or to prevent the piston 60 from being rubbed. Thus, it is possible to eliminate defects such as leakage of hydraulic fluid, defective movement or operation of the component parts, which may otherwise occur when the component parts are assembled together.

It is to be understood that the invention is not limited to the above-described specific embodiment, but various changes and modifications may be made to the invention. For instance, an annular ring seal such as a copper gasket seal may be arranged between the outward flange 42 of the cap element 34 and the bottom of the boss 12. In this case, the O-ring seals 30 and 36 arranged respectively about the outer and inner peripheral surfaces of the other end 28 of the body 22 may be dispensed with.

Figure 2:
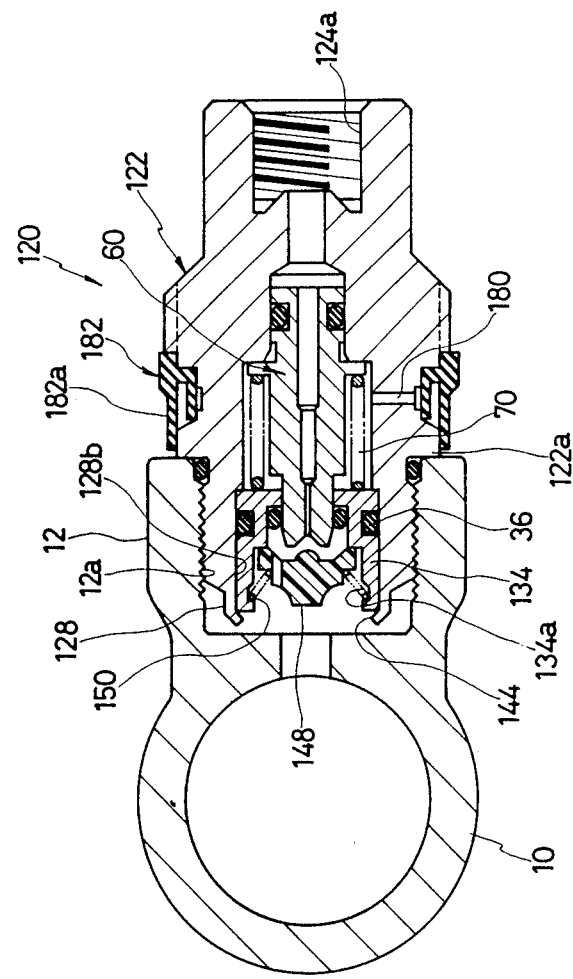

Referring next to FIG. 2, there is illustrated a hydraulic pressure control valve 120 according to another embodiment of the invention. In FIG. 2, component parts like or similar to those illustrated in FIG. 1 are designated by the same or like reference numerals, and the detailed description of such like or similar component parts will therefore be omitted to avoid repetition.

In the control valve 120 shown in FIG. 2, a cap element 134 is fixed to a body 122 by means of caulking of an end 128 of the body 122 to an end of the cap element 134 adjacent the end 128 of the body 122. Specifically, the entire peripehral edge of the end 128 of the body 122 is caulked at 144 to the end of the cap element 134. To this end, the end 128 of the body 122 is reduced in thickness. Since the end 128 of the body 122 is caulked to the end of the cap element 134 in such a state that the cap element 134 is fully accommodated in the inlet bore 128b, an influence upon the internal component parts, particularly, upon the piston 60 can be reduced. Furthermore, in a state in which the control valve 120 is mounted to the boss 12 of the cylinder body 10 of the master cylinder, the caulked end of the body 122 is maintained out of contact with the bottom of the boss 12. That is, when the body 122 is threadedly engaged with the female threads 12a of the boss 12, a step 122a formed on the outer peripheral surface of the body 122 is abutted against the forward end face of the boss 12 so that the step 122a serves as a stopper for positioning the control valve 120 with respect to the boss 12. By the step 122a, the caulked end of the body 122 is maintained out of contact with the bottom of the boss 12. Thus, an influence upon the internal component parts of the control valve 120 can further be reduced.

Further, in the embodiment illustrated in FIG. 2, the cap element 134 has an annular groove or step 134a formed in the inner peripheral surface of the cap element 134 at a location adjacent the end of the cap element 134 remote from the outlet bore 124a. One end of a valve spring 150 is received in the annular groove or step 134a. The other end of the valve spring 150 is in engagement with a valve element 148. By doing so, the spring retainer 52 illustrated in FIG. 1 may be dispensed with so that the number of component parts can be reduced. Furthermore, an annular seal element 182 arranged about the body 122 to cover a radial aperture 180 is provided with a double-lip structure 182a. A radially inward lip of the double-lip structure 182a serves as a check valve. On the other hand, a radially outward lip of the double-lip structure 182a ensures that foreign matter is prevented from entering the atmospheric chamber 70 through the radial aperture 180.

In the embodiment illustrated in FIG. 2, it is preferable that the end 128 of the body 122 is caulked to the end of the cap element 134 in a fluid-tight manner. In this case, the O-ring seal element 36 may be dispensed with.

What is claimed is:

1. A hydraulic pressure control valve for use with a brake master cylinder, comprising:
    a hollow body of one-piece structure having an outlet bore and an inlet formed respectively in one and other ends of said body, said body having an internal stepped bore which extends between said outlet bore and said inlet bore and through which said outlet bore and said inlet bore communicate with each other, said body being provided, adjacent the other end thereof, with a mounting portion to said master cylinder;
    a piston arranged in said stepped bore of said body for reciprocative movement along said stepped bore in response to hydraulic pressure introduced into said body from said master cylinder, said piston being formed therein with a passage through which said outlet bore and said inlet bore communicate with each other, said piston having one end thereof remote from said outlet bore, whose end face serves as a valve seat;
    spring means arranged within said body for biasing said piston toward said outlet bore;
    a substantially tubular cap element arranged in said inlet bore for substantially closing said stepped bore, wherein said cap element supports said one end of said piston, and wherein said cap element has an inner peripheral surface thereof which defines a valve chamber;
    fixing means arranged between said cap element and said body for fixing said cap element to said body without being accompanied with rotation of said cap element and said body relative to each other, wherein said fixing means is formed by caulking of one of said body and said cap element to the other; and
    a valve element arranged within said valve chamber in facing relation to said valve seat provided at the one end of said piston, wherein said valve element is normally spaced away from said valve seat, but is seated on said valve seat when said hydraulic pressure reaches a predetermined level to move said piston toward said valve element against biasing force of said spring means, thereby causing said valve element to close said passage in said piston.

2. A hydraulic pressure control valve for use with a brake master cylinder, comprising:
    a hollow body of one-piece structure having an outlet bore and an inlet bore formed respectively in one and other ends of said body, said body having an internal stepped bore which extends between said outlet bore and said inlet bore and through which said outlet bore and said inlet bore communicate with each other, said body being provided, adjacent the other end thereof, with a mounting portion to said master cylinder;
    a piston arranged in said stepped bore of said body for reciprocative movement along said stepped bore in response to hydraulic pressure introduced into said body from said master cylinder, said piston being formed therein with a passage through which said outlet bore and said inlet bore communicate with each other, said piston having one end thereof remote from said outlet bore, whose end face serves as a valve seat;
    spring means arranged within said body for biasing said piston toward said outlet bore;
    a substantially tubular cap element arranged in said inlet bore for substantially closing said stepped bore, wherein said cap element supports said one end of said piston, and wherein said cap element has an inner peripheral surface thereof which defines a valve chamber;
    fixing means arranged between said cap element and said body for fixing said cap element to said body without being accompanied with rotation of said cap element and said body relative to each other, wherien said fixing means is formed by caulking of the other end of said body to an end of said cap element adjacent the other end of said body; and
    a valve element arranged within said valve chamber in facing relation to said valve seat provided at the one end of said piston, wherein said valve element is normally spaced away from said valve seat, but is seated on said valve seat when said hydraulic pressure reaches a predetermined level to move said piston toward said valve element against biasing force of said spring means, thereby causing said valve element to close said passage in said piston.

3. A hydraulic pressure control valve according to claim 2, wherein an entire peripheral edge of the other end of said body is caulked to the end of said cap element in a fluid-tight manner.

4. A hydraulic pressure control valve for use with a brake master cylinder, comprising:
    a hollow body of one-piece structure having an outlet bore and an inlet bore formed respectively in one and other ends of said body, said body having an internal stepped bore which extends between said outlet bore and said inlet bore and through which said outlet bore and said inlet bore communicate with each other, said body being provided, adjacent the other end thereof, with a mounting portion to said master cylinder;
    a piston arranged in said stepped bore of said body for reciprocative movement along said stepped bore in response to hydraulic pressure introduced into said body from said master cylinder, said piston being formed therein with a passage through which said outlet bore and said inlet bore communicate with each other, said piston having one end thereof remote from said outlet bore, whose end face serves as a valve seat;

spring means arranged wtihin said body for biasing said piston toward said outlet bore;

a substantially tubular cap element arranged in said inlet bore for substantially closing said stepped bore, wherein said cap element supports said one end of said piston, and wherien said cap element has an inner peripheral surface thereof which defines a valve chamber;

fixing means arranged between said cap element and said body for fixing said cap element to said body without being accompanied with rotation of said cap element and said body relative to each other;

a valve element arranged within said valve chamber in facing relation to said valve seat provided at the one end of said piston, wherein said valve elemnt is normally spaced away from said valve seat, but is seated on said valve seat when said hydraulic pressure reaches a predetermined level to move said piston toward said valve element against biasing force of said spring means, thereby causing said valve element to close said passage in said piston; and a valve spring arranged within said valve chamber for biasing said valve element toward said valve seat provided at the one end of said piston; wherein said inner peripheral surface of said cap element is formed with a step, and wherein said valve spring urges said valve element against said step of said inner peripheral surface of said cap element.

5. A hydraulic pressure control valve according to claim 4, wherein said fixing means is formed by force-fitting of said cap element into said inlet bore of said body.

6. A hydraulic pressure control valve according to claim 4, wherien said fixing means is formed by caulking of one of said body and said cap element to the other.

7. A hydraulic pressure control valve according to claim 4, wherein said stepped bore in said body is composed of a small-diameter bore section and an intermediate-diameter bore section, said small-diameter bore section being located adjacent said outlet bore, and wherein said inlet bore is larger in diameter than said intermediate-diameter bore section which, in turn, is larger in diameter than said small-diameter bore section.

8. A hydraulic pressure control valve according to claim 7, wherein both said piston and said valve element are inserted in said body through the other end thereof.

9. A hydraulic pressure control valve according to claim 4, further comprising a spring retainer fixedly mounted in said valve chamber, said valve spring being interposed between said spring retainer and said valve element for biasing the latter into abutment against said step of said inner peripheral surface of said cap element.

10. A hydraulic pressure control valve according to claim 4, wherein said cap element has an annular groove formed in said inner peripheral surface of said cap element at a location adjacent an end of said cap element remote from said outlet bore, and wherein said valve spring has one end thereof received in said annular groove, and the other end in engagement with said valve element.

* * * * *